(12) United States Patent
    Bailie

(10) Patent No.: US 10,506,799 B2
(45) Date of Patent: Dec. 17, 2019

(54) BIRD PROPELLED ROTATING HUMMINGBIRD FEEDER

(71) Applicant: David A Bailie, Covington, WA (US)

(72) Inventor: David A Bailie, Covington, WA (US)

( * ) Notice: Subject to any disclaimer, the term of this patent is extended or adjusted under 35 U.S.C. 154(b) by 200 days.

(21) Appl. No.: 15/891,267

(22) Filed: Feb. 7, 2018

(65) Prior Publication Data

US 2019/0239485 A1    Aug. 8, 2019

(51) Int. Cl.
    *A01K 39/02*    (2006.01)
(52) U.S. Cl.
    CPC ................................. *A01K 39/0206* (2013.01)
(58) Field of Classification Search
    CPC ........................... A01K 39/0206; A01K 39/04
    USPC ............................................ 119/57.8, 72, 74
    See application file for complete search history.

(56) References Cited

U.S. PATENT DOCUMENTS

| 5,269,259 | A | 12/1993 | Keeler |
| 5,450,816 | A | 9/1995 | Santa Cruz |
| 6,050,221 | A | 4/2000 | Eaton et al. |
| 7,171,921 | B1 | 2/2007 | Lush |
| 7,448,346 | B1* | 11/2008 | Stone ..................... A01K 31/12 119/52.3 |
| 2002/0157615 | A1* | 10/2002 | Laske, Jr. ............ A01K 39/012 119/57.8 |
| 2011/0011345 | A1* | 1/2011 | LoRocco ............... A01K 39/02 119/72 |
| 2014/0158056 | A1* | 6/2014 | Vaughn, Jr. ........ A01K 39/0206 119/72 |
| 2015/0075435 | A1* | 3/2015 | Hazel ................ A01K 39/0113 119/57.9 |

\* cited by examiner

*Primary Examiner* — David J Parsley
*Assistant Examiner* — Danielle A Clerkley
(74) *Attorney, Agent, or Firm* — George A. Leone; Citadel Patent Law

(57) ABSTRACT

A bird propelled rotating hummingbird feeder. A pivot housing includes a central axis and a central hole. A plurality of fins is configured as dual opposing fin sets, where each fin is angled at an oblique angle with respect to a plane passing perpendicularly through the central axis and each fin set comprises at least three angled fins attached to the pivot housing so as to be symmetrically located opposite the other dual opposing fin set with the pivot housing centered between the dual opposing fin sets. A feeder jar housing integrated into each of the dual opposing fin sets central fin. A pivot cable is inserted through the central hole and a bearing element it is attached to a bottom end of the pivot cable within the pivot housing. A hanger is attached to a top end of the pivot cable.

20 Claims, 6 Drawing Sheets

BIRD PROPELLED ROTATING HUMMINGBIRD FEEDER

TECHNICAL FIELD

The present invention relates to hummingbird feeders. More particularly, the invention relates to a rotating hummingbird feeder that rotates in response to a downdraft from beating wings of a hummingbird while feeding.

BACKGROUND

There are many types of birdfeeders that have been available for many years in the past. For example, U.S. Pat. No. 5,269,259 to Keeler, issued Dec. 14, 1993 and entitled "Rotating Hummingbird Feeder," discloses a hummingbird feeder that rotates to position a feeding hole in close proximity to the level of the liquid contained therein. The feeder, basically circular in cross section, is mounted to allow rotation around the axial center of the circular cross section. One face of the feeder has a hole through which the humming birds drink the liquid.

In another example, U.S. Pat. No. 5,450,816 issued to Santa Cruz on Sep. 19, 1995 discloses a hummingbird feeder that includes a flower member having a limited capacity fluid chamber associated with an angled hollow tubular calyx portion which is dimensioned to receive the upper end of a tubular support member.

In another example, U.S. Pat. No. 6,050,221 issued to Eaton et al. on Apr. 18, 2000 discloses a birdfeeder that prevents animals such as squirrels, chipmunks, and rodents from gaining access to feed in the bird feeder. The bird feeder includes a housing that is rotatably attached to a support shaft allowing at least 360 degrees of rotation. The housing includes a plurality of angled plates that cause the housing to spin when the animal contacts one of the plates. A feed tray is rigidly attached to the support shaft and remains upright and stationary within the housing while the housing rotates about the support shaft.

In yet another example, U.S. Pat. No. 7,171,921 issued to Lush on Feb. 6, 2007 discloses a squirrel repelling hanger for a bird feeder which utilizes a load cell which senses the weight of a squirrel thereon and which energizes a motor to rotate a repelling disk located at the upper end of the hanger without rotating the bird feeder which is supported from the lower end of the hanger.

The market for hummingbird feeders remains active and there is a need for a more attractive, functionally different hummingbird feeder which would provide a delightful and playful interaction between hummingbird and the feeder. Such a feeder would provide both food for the birds and entertainment for the viewer. Thus, there is a need for an attractive bird propelled rotating hummingbird feeder.

BRIEF SUMMARY OF THE DISCLOSURE

This summary is provided to introduce, in a simplified form, a selection of concepts that are further described below in the Detailed Description. This summary is not intended to identify key features of the claimed subject matter, nor is it intended to be used as an aid in determining the scope of the claimed subject matter.

A bird propelled rotating hummingbird feeder is disclosed having a pivot housing that includes a central axis and a central hole. A plurality of fins is configured as two symmetrical sets of dual opposing fin sets, where each fin is angled at an oblique angle with respect to a plane passing perpendicularly through the central axis and each fin set comprises at least three angled fins attached to the pivot housing so as to be symmetrically located opposite the other dual opposing fin set with the pivot housing centered between the dual opposing fin sets. A feeder jar housing is integrated into a central fin of each of the dual opposing fin sets. A pivot cable is inserted through the central hole and a bearing element it is attached to a bottom end of the pivot cable within the pivot housing. A hanger is attached to a top end of the pivot cable.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

Figure 1:
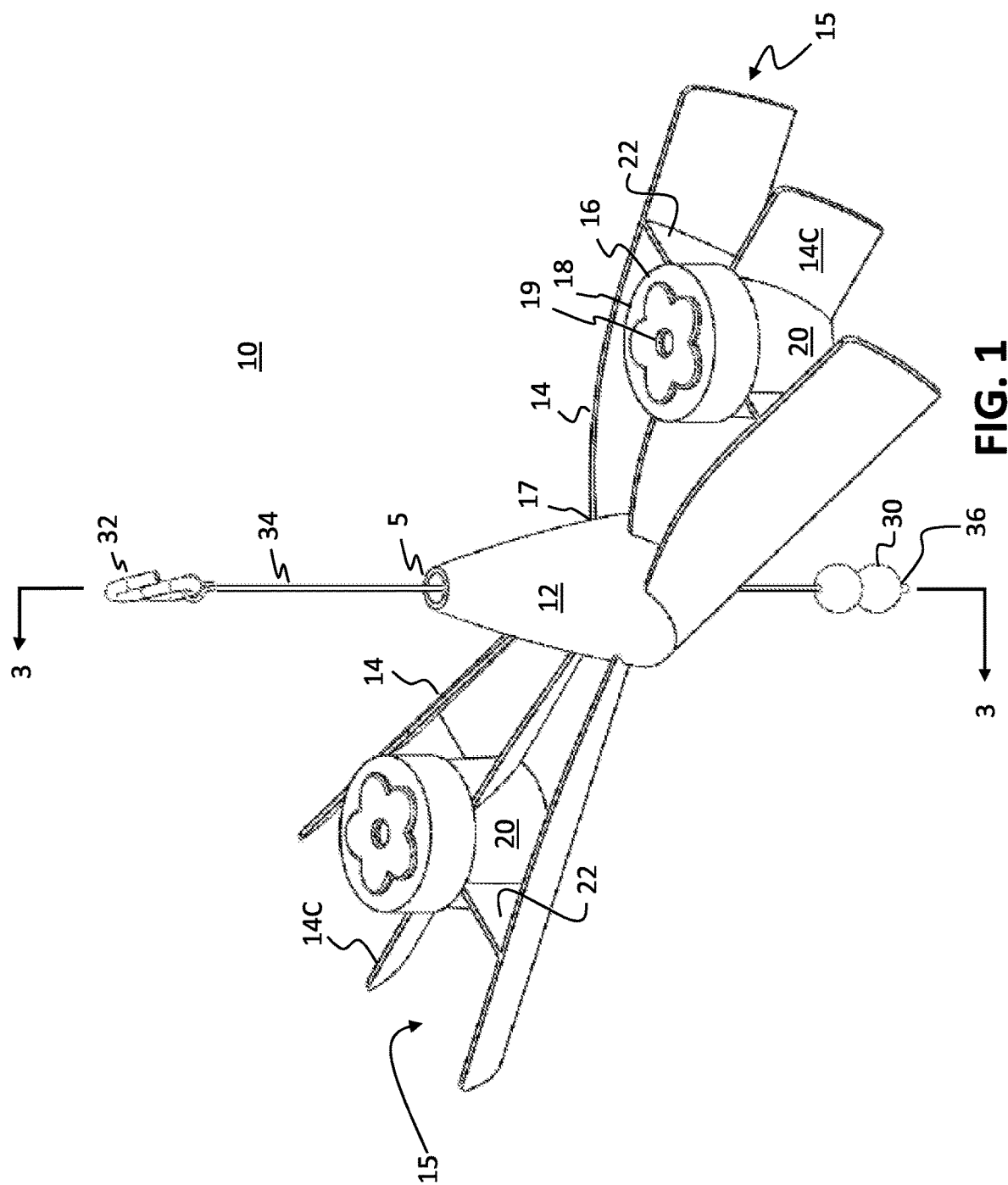
FIG. 1 schematically shows a top perspective view of the components used in one example of a bird propelled rotating hummingbird feeder.

In the drawings, identical reference numbers call out similar elements or components. The sizes and relative positions of elements in the drawings are not necessarily drawn to scale. For example, the shapes of various elements and angles are not drawn to scale, and some of these elements may be arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION OF THE PREFERRED EMBODIMENTS

The following disclosure describes a bird propelled rotating hummingbird feeder. Several features in accordance with example embodiments are set forth and described in the figures. It will be appreciated that designs in accordance with other example embodiments can include additional procedures or features different than those shown in the figures. Example embodiments are described herein with respect to a bird propelled rotating hummingbird feeder having dual opposing sets of fins. However, it will be understood that these examples are for the purpose of illustrating the principles, and that the invention is not so limited.

Definitions

Generally, as used herein, the following terms have the following meanings, unless the use in context dictates otherwise:

The use of the word "a" or "an" when used in conjunction with the term "comprising" in the claims or the specification means one or more than one, unless the context dictates otherwise. The term "about" means the stated value plus or minus the margin of error of measurement or plus or minus 10% if no method of measurement is indicated. The use of the term "or" in the claims is used to mean "and/or" unless explicitly indicated to refer to alternatives only or if the alternatives are mutually exclusive. The terms "comprise", "have", "include" and "contain" (and their variants) are open-ended linking verbs and allow the addition of other elements when used in a claim.

Reference throughout this specification to "one example" or "an example embodiment," "one embodiment," "an embodiment" or combinations and/or variations of these terms means that a particular feature, structure or characteristic described in connection with the embodiment or example is included in at least one embodiment of the present disclosure. Thus, the appearances of the phrases "in one embodiment" or "in an embodiment" in various places throughout this specification are not necessarily all referring to the same embodiment or example. Furthermore, the particular features, structures, or characteristics may be combined in any suitable manner in one or more embodiments or examples.

Referring now to FIG. 1, a top perspective view of the components used in one example of a bird propelled rotating hummingbird feeder is schematically shown. A bird propelled rotating hummingbird feeder assembly generally designated by reference number 10 includes a pivot housing 12, a plurality of fins 14, at least two feeder jars 18 having jar lids 16, and a pivot cable 34. In one example, the plurality of fins 14 are configured as two symmetrical sets of dual opposing triple fin sets 15.

Figure 3:
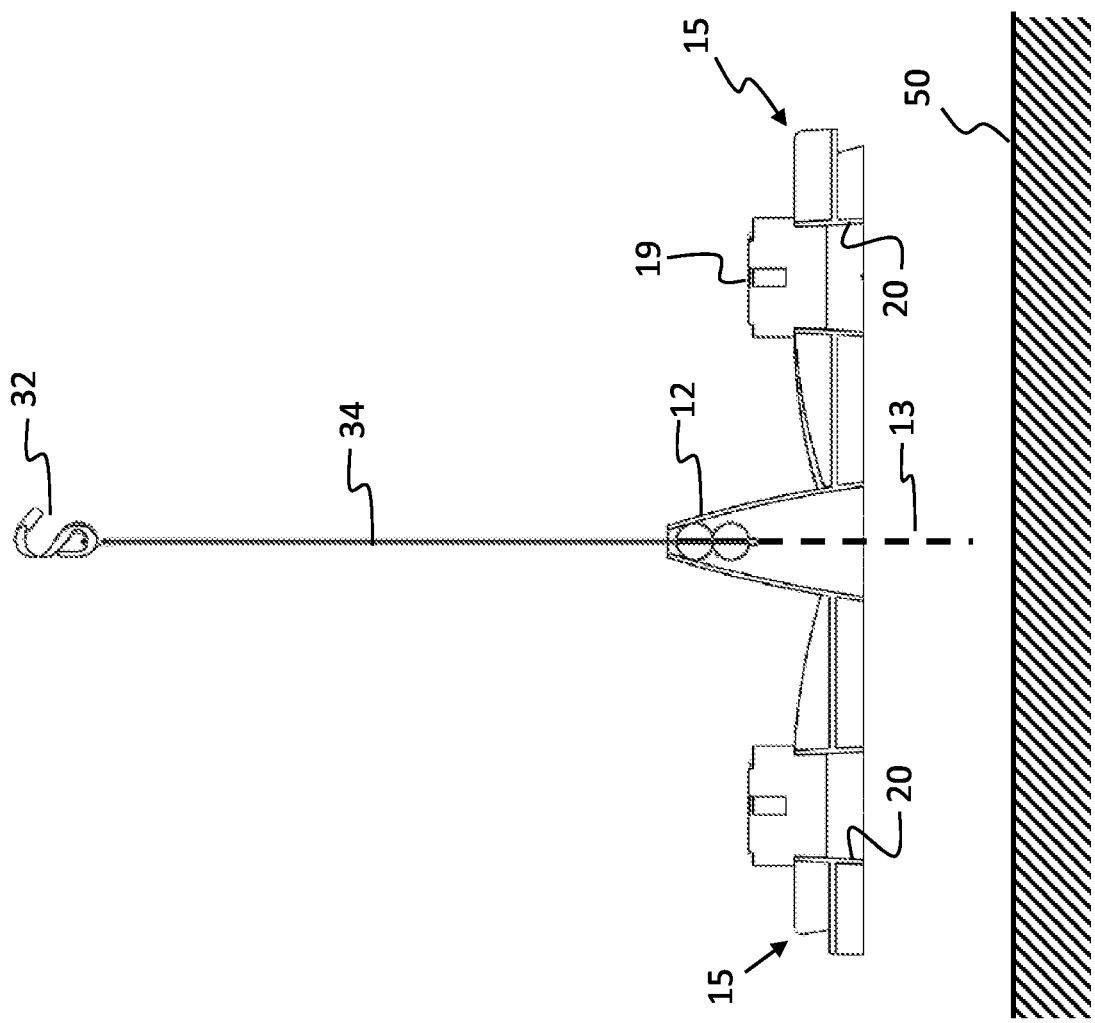
FIG. 3 schematically shows a side elevated view of one example of a bird propelled rotating hummingbird feeder.

In one useful example, each fin set 15 comprises at least 3 angled fins attached to the pivot housing 12 so as to more or less symmetrically oppose the opposite fin set. Each fin is angled at an oblique angle, that is, an acute or an obtuse angle depending on the measurement perspective, with respect to a horizontal plane passing perpendicularly through the central axis 13 of the pivot housing 12, where the central axis 13 substantially coincides with the pivot cable 34 when the pivot cable is in a straight vertical position with respect to the ground (as best shown in FIG. 3). The fins 14 project radially outwardly from the central axis 13. Each fin in each triple fin set 15 is attached at a first end 17 to the pivot housing 12. A feeder jar housing 20 may be integrated into a central fin 14C of each fin set 15 and further joined to outside fins 14 by a set of fin supports 22.

In one useful example, a flower design element 24 may be attached to the top of the jar lid 16 so as to attract hummingbirds. The flower design element 24 may comprise a plastic flower design, for example, mimicking the colors of real flowers, such as bright yellow, for example. An open conduit 19 leading into the interior of the feeder jar may be included so as to allow a hummingbird to access nectar or other fluids contained in the feeder jar 18. Round feeder jars, sometimes called nectar dots, of the type used herein typically have screw on or snug fit lids and are commercially available.

The pivot cable 34 may be terminated at a first end to a hanger 32, such as a loop at the end of the cable, a hook and loop, or other suitable hanger. When assembled, the pivot cable 34 is inserted through the housing 12 through hole 5. After inserting the hanger 32 through the housing 12, at least one bead 30 may be loosely threaded onto the cable. A knot 36 may be formed at the terminal end of the cable so as to hold the at least one bead 30 in place. Of course, any retaining element may be used such as a crimp, cap or the like. In one useful example, at least one bead 30 may comprise two contacting plastic beads which operate to support the rotating assembly and service bearings to allow easy rotation of the entire assembly in the presence of a feeding hummingbird.

Figure 2:
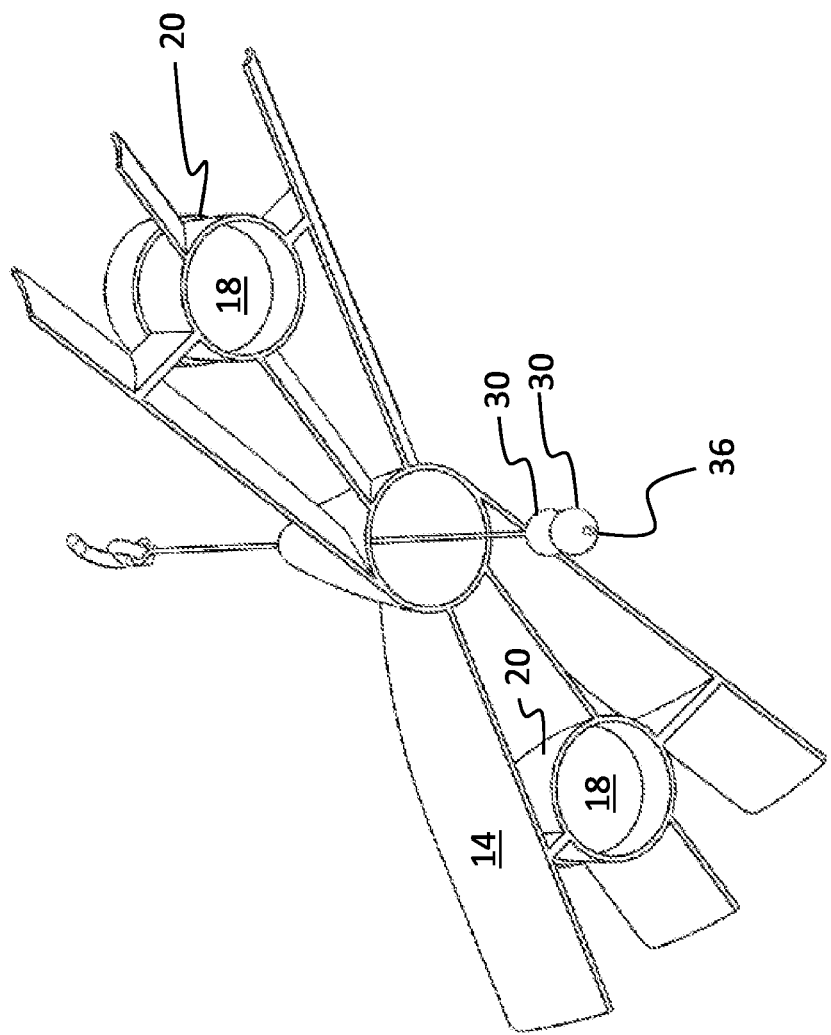
FIG. 2 schematically shows a bottom perspective view of one example of a bird propelled rotating hummingbird feeder.

Referring now to FIG. 2, a bottom perspective view of one example of a bird propelled rotating hummingbird feeder is schematically shown. A feeder jar 18 is snuggly fit into each feeder jar housing 20. Each feeder jar housing 20 is sized to hold a feeder jar in place by a friction fit, for example. In one example of the bird propelled rotating hummingbird feeder a feeder jar may be integrated with the housing thereby making it an integral part of the assembly 10.

Referring now to FIG. 3, a site elevated view of one example of a bird propelled rotating hummingbird feeder is schematically shown. The central axis 13 of the pivot housing assembly 12, for example, where the pivot housing assembly has a generally conical shape, substantially coincides with the central axis of pivot cable 34. The dual fin assemblies 15 symmetrically oppose each other on either side of the central axis when the pivot cable is in a straight vertical position with respect to horizontal ground 50.

Figure 4:
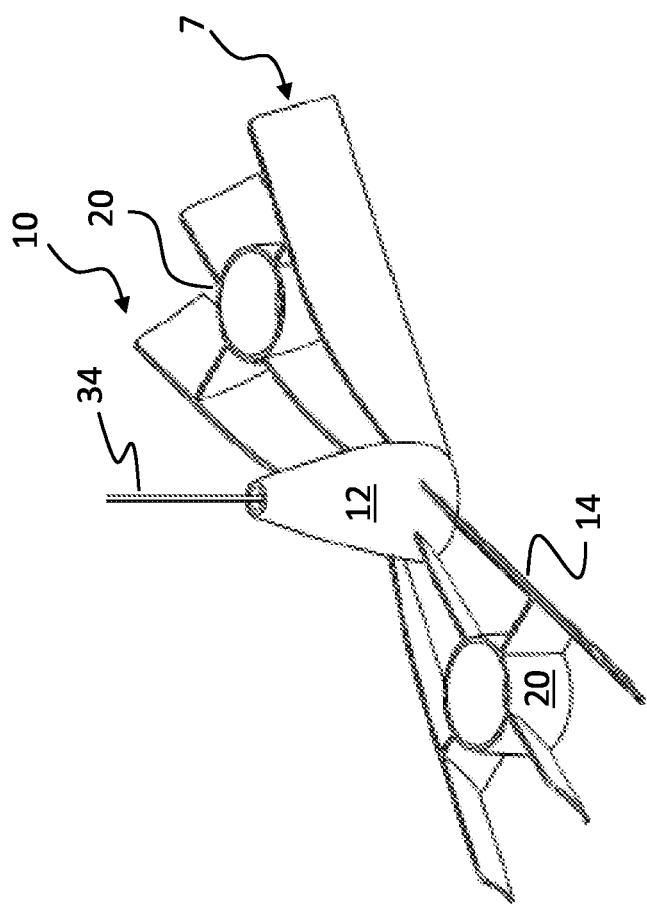
FIG. 4 schematically shows a partial perspective view of one example of a bird propelled rotating hummingbird feeder with the feeder jars removed.

Referring now to FIG. 4, a partial perspective view of one example of a bird propelled rotating hummingbird feeder with the feeder jars removed is schematically shown. Here shown is a partial view of the assembly 10 wherein the feeder jars and caps have been removed from the feeder jar housings 20. A main assembly 7 including the fins 14, fin supports 22, pivot housing 12 and feeder jar housings 20 may be made as a unitary construct from plastic, PETN, nylon, and equivalents. The main housing may be manufactured using standard techniques such as molds, 3D printing and other manufacturing processes. The main assembly may be made in an alternative embodiment using similar manufacturing techniques by integrating the feeder jars and the feeder jar housings. Further, while the jar lid is preferably removable for easy filling of the feeder jars, it may also be integrated with the feeder jars and feeder jar housing if desired.

Figure 5:
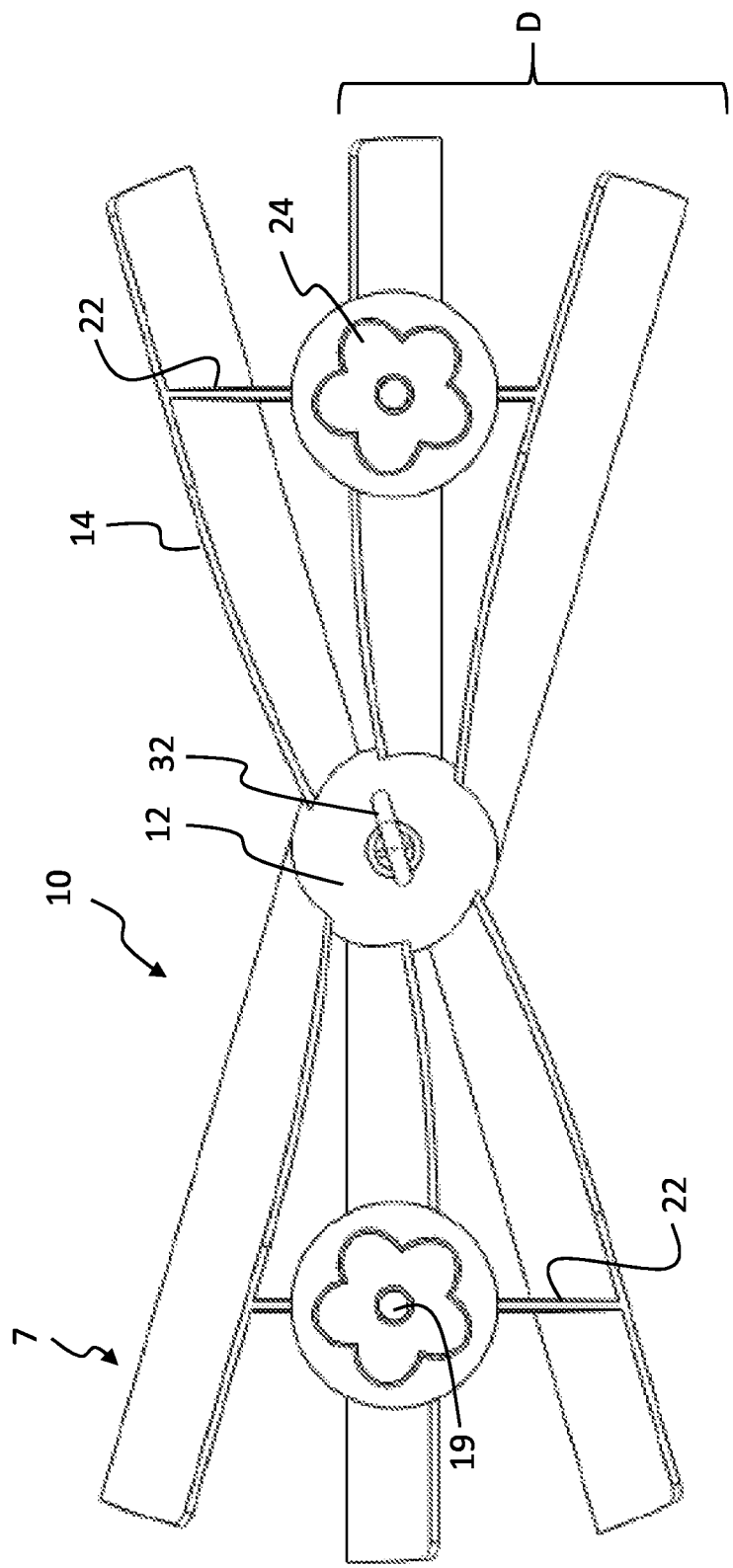
FIG. 5 schematically illustrates a top view of a bird propelled rotating hummingbird feeder with the birdfeeder jars installed.

Referring now to FIG. 5, a top view of a bird propelled rotating hummingbird feeder with the birdfeeder jars installed is schematically shown. While not so limited, in one embodiment the main assembly 7 is constructed to have a plurality of thin fins 14. The fins 14 may have a thickness of less than about 0.1 cm, while the overall length from central fin to central fin may be about 22 cm. Each fin may have a height of about 2 cm. The diameter of the base of the housing may be about 2.5 cm with a height of about 6 cm. The distance D between the ends of the middle and outside fins 14 may advantageously be uniform. In one example, the distance D is about 4 cm. The beads 30 may comprise plastic beads having a 10 mm diameter.

Figure 6:
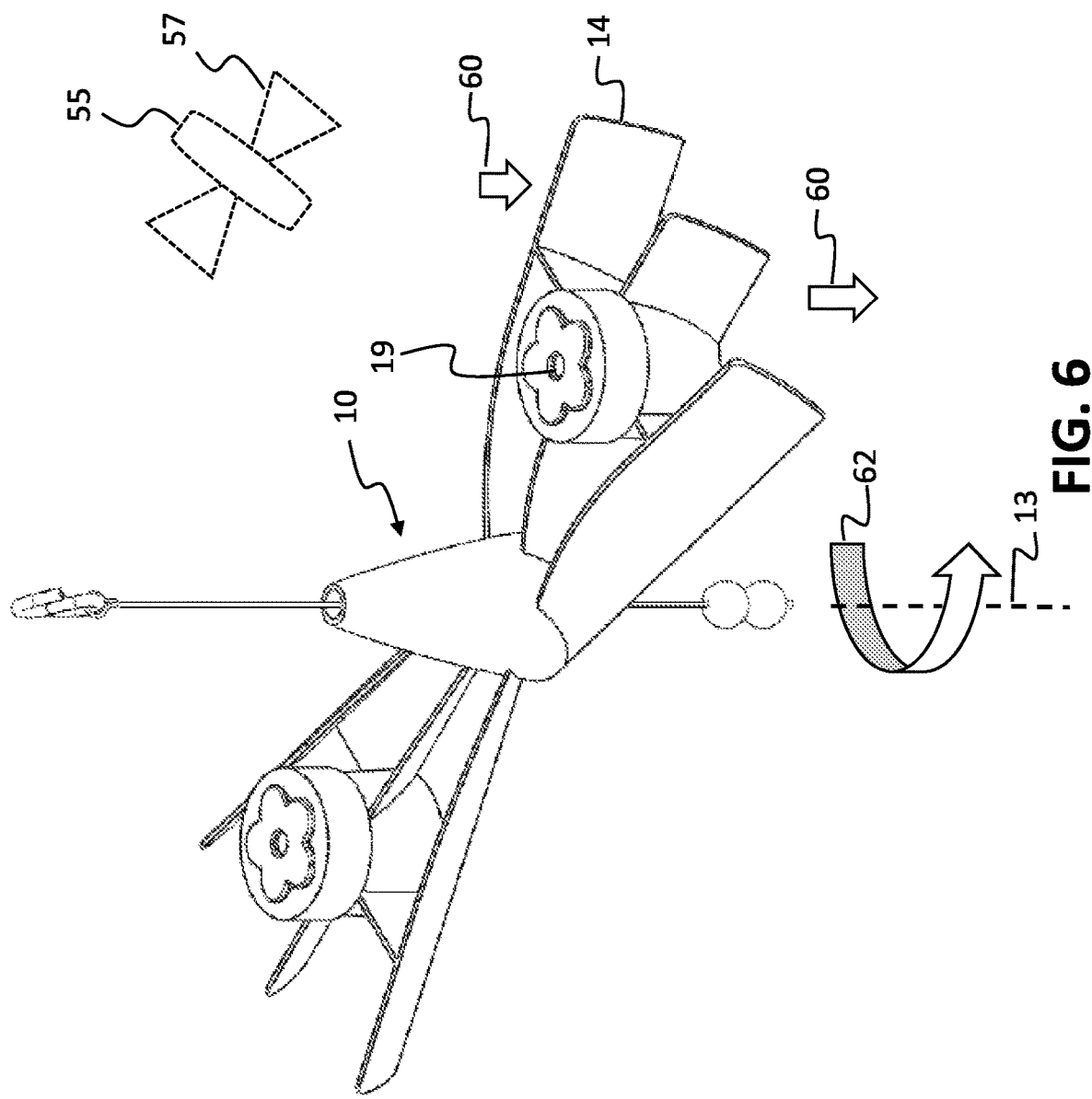
FIG. 6 schematically illustrates the operational characteristics of a bird propelled rotating hummingbird feeder when activated by a feeding hummingbird.

Referring now to FIG. 6, the operational characteristics of a bird propelled rotating hummingbird feeder when activated by a feeding hummingbird is schematically illustrated. Having described the bird propelled rotating hummingbird feeder in detail, it is considered beneficial to the understanding of the invention to now describe it in operation as observed and filmed by the inventor. When a hummingbird (here conceptualized as shape 55) approaches the hummingbird feeder 10 and begins to feed by inserting its tongue or beak into the feeder conduit 19 usually the hummingbird will continue flying. The beating wings 57 of the hummingbird then cause a downdraft indicated by arrows 60 that impinge on the surfaces of the fins 14. The downdraft then causes the assembly to rotate in a clockwise or counterclockwise direction about the central axis 13 as generally indicated by rotational arrow 62. While feeding, it has been observed that a hummingbird will typically continue to follow the feeder jar for a time as it rotates, thereby causing the bird to circle around the pivot cable.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment, and devices, and that various modifications, both as to the equipment details and operating procedures, may be accomplished without departing from the true spirit and scope of the present invention.

What is claimed is:

1. A bird propelled rotating hummingbird feeder comprising:
   a pivot housing having a central axis and a central hole;
   a plurality of fins configured as at least two symmetrical opposing fin sets, where each fin is angled at an oblique angle with respect to a plane passing perpendicularly through the central axis;
   wherein each fin set comprises at least three angled fins, the at least three angled fins include a central fin and two outside fins, attached to the pivot housing so as to be symmetrically located opposite the other dual opposing fin set with the pivot housing centered between the dual opposing fin sets;
   at least two feeder jar housings integrated into each of the dual opposing fin sets central fin;
   a pivot cable inserted through the central hole;
   a bearing element attached to a bottom end of the pivot cable within the pivot housing; and
   a hanger attached to a top end of the pivot cable.

2. The feeder of claim 1 wherein each of the plurality of fins project substantially radially outwardly from the central axis.

3. The feeder of claim 1 wherein each feeder jar housing is integrated into the central fin in each dual opposing fin set and joined to the two outside fins by a set of fin supports.

4. The feeder of claim 1 further comprising feeder jars inserted into the feeder jar housings.

5. The feeder of claim 1 further comprising jar lids removably attached to the feeder jars, the jar lids including a conduit open at one end to the feeder jar and open at a top end to allow access from outside for feeding.

6. The feeder of claim 5 further comprising a design element located on the top of the jar lid.

7. The feeder of claim 6 wherein the design element comprises a flower design.

8. The feeder of claim 1 wherein the bearing element comprises at least one bead threaded onto the cable.

9. The feeder of claim 1 further comprising a feeder jar integrated with the feeder housing thereby making it an integral part of feeder housing.

10. The feeder of claim 1 wherein where the pivot housing assembly has a generally conical shape.

11. The feeder of claim 1 wherein, except for the pivot cable, the elements are made from materials selected from the group consisting of plastic, PETN, nylon, and combinations thereof.

12. The feeder of claim 1 which is adapted to rotate in response to the beating wings of a feeding hummingbird.

13. A bird propelled rotating hummingbird feeder comprising:
    a conical pivot housing having a central axis and a central hole;
    a plurality of fins configured as two symmetrical opposing fin sets, where each fin is angled at an oblique angle with respect to a plane passing perpendicularly through the central axis;
    wherein each fin set comprises at least three angled fins, the at least three angled fins include a central fin and two outside fins, attached to the conical pivot housing so as to be symmetrically located opposite the other dual opposing fin set with the pivot housing centered between the dual opposing fin sets;
    at least two feeder jar housings integrated into each of the dual opposing fin sets central fin, wherein each feeder jar housing is integrated into a center fin all split located between two outside fins in each dual opposing fin set and joined to the two outside fins by a set of fin supports;
    a feeder jar having a removable lid held in each feeder jar housing, wherein the lid includes a hole leading to a conduit into a chamber of each feeder jar;
    a pivot cable inserted through the central hole;
    at least two beads attached to a bottom end of the pivot cable within the pivot housing, where the at least two beads make contact with each other when the feeder is hanging from the pivot cable; and
    a hanger attached to a top end of the pivot cable.

14. The feeder of claim 13 wherein the plurality of fins each project substantially radially outwardly from the central axis.

15. The feeder of claim 13 further comprising a design element located on the top of the jar lid.

16. The feeder of claim 15 wherein the design element comprises a flower design.

17. The feeder of claim 13 wherein each feeder jar is integrated with each feeder housing thereby making it an integral part of feeder housing.

18. The feeder of claim 13 wherein, except for the pivot cable, the elements are made from materials selected from the group consisting of plastic, PETN, nylon, and combinations thereof.

19. The feeder of claim 13 which is adapted to rotate in response to the beating wings of a feeding hummingbird.

20. A kit for a bird propelled rotating hummingbird feeder comprising:
    a unitary assembly including
        a conical pivot housing having a central axis and a central hole,
        a plurality of fins configured as two symmetrical opposing fin sets, where each fin is adapted to be angled at an oblique angle with respect to a plane passing perpendicularly through the central axis,
        wherein each fin set comprises at least three angled fins, the at least three angled fins include a central fin and two outside fins, attached to the conical pivot housing so as to be symmetrically located opposite the other dual opposing fin set with the pivot housing centered between the dual opposing fin sets,
        at least two feeder jar housings integrated into each of the dual opposing fin sets central fin, wherein each feeder jar housing is integrated into a center fin all split located between two outside fins in each dual opposing fin set and joined to the two outside fins by a set of fin supports, a plurality of feeder jars where each feeder jar is adapted to be inserted into one of the feeder jar housings;

a plurality of removable lids, each lid adapted to cover a feeder jar, wherein each lid includes a hole leading to a conduit into a chamber of each feeder jar;

a pivot cable adapted to be inserted through the central hole;

at least two beads adapted to be attached to a bottom end of the pivot cable within the pivot housing, where the at least two beads make contact with each other when the feeder is hanging from the pivot cable; and a hanger adapted to be attached or attached to a top end of the pivot cable.

\* \* \* \* \*